United States Patent [19]

Bergandy

[11] 4,442,954
[45] Apr. 17, 1984

[54] SELF-PRESSURIZING PINCH VALVE

[75] Inventor: Wieslaw Bergandy, Arnold, Md.

[73] Assignee: National Instrument Company, Inc., Baltimore, Md.

[21] Appl. No.: 403,331

[22] Filed: Jul. 30, 1982

[51] Int. Cl.³ .......................... B67D 5/08; F16L 55/14
[52] U.S. Cl. ...................................... 222/55; 222/131; 222/212; 222/215; 137/488; 251/5
[58] Field of Search .................... 137/488, 492; 251/5, 251/7; 604/34, 153, 250; 128/79 A; 222/52, 53, 55, 56, 73, 206, 212, 214, 215, 394, 396, 397, 130, 131

[56] References Cited

U.S. PATENT DOCUMENTS

| | | | |
|---|---|---|---|
| 2,572,658 | 10/1951 | Perkins | 119/14.08 |
| 3,007,416 | 11/1961 | Childs | 604/153 X |
| 3,329,390 | 7/1967 | Hulsey | 251/4 |
| 3,511,268 | 5/1970 | Dubrovsky et al. | 137/487 |
| 3,522,926 | 8/1970 | Bryant et al. | 251/5 |
| 3,984,080 | 10/1976 | Varis et al. | 251/5 |
| 4,071,039 | 1/1978 | Goof | 137/87 |
| 4,108,418 | 8/1978 | Ensign et al. | 251/5 |
| 4,135,550 | 1/1979 | Andersson | 137/565 |
| 4,195,810 | 4/1980 | Lavin | 251/5 |
| 4,322,054 | 3/1982 | Campbell | 251/5 |

FOREIGN PATENT DOCUMENTS 2042128 9/1980 United Kingdom ..................... 251/5

Primary Examiner—Joseph J. Rolla
Assistant Examiner—Michael S. Huppert
Attorney, Agent, or Firm—Antonelli, Terry & Wands

[57] ABSTRACT

A self-pressurizing pinch valve is disclosed which is suitable for controlling the flow of liquid in a filling machine for dispensing predetermined quantities of liquid. The pinch valve comprises a flexible hose for conveying the liquid, a chamber defined about at least a portion of the flexible hose, the flexible hose being adapted to be pinched in the chamber for valving the flow of liquid therethrough, and a valve arrangement responsive to movement of the flexible hose for controlling the pressure in the chamber so that it substantially balances the internal pressure in the hose. This valve arrangement includes a check valve which is opened to increase the pressure in the chamber in response to radial expansion of the hose and an outlet which is closed by the flexible hose when the pressure in the chamber is less than or substantially equal to the internal pressure in the hose and opened when the fluid pressure in the chamber is substantially greater than the internal pressure in the hose so as to radially compress the hose.

9 Claims, 4 Drawing Figures

SELF-PRESSURIZING PINCH VALVE

BACKGROUND AND SUMMARY OF THE INVENTION

The present invention relates to an improved pinch valve for controlling the flow of fluid. More particularly, the invention concerns a self-pressurizing pinch valve for controlling the flow of fluid under pressure.

In liquid filling machines for dispensing predetermined quantities of liquid into containers, for example, valves are generally provided for controlling the flow of the liquids. When the liquids being dispensed must be of high purity, as in the case of medicines, for example, the valves employed in the filling machines must be carefully selected so as not to cause contamination problems, e.g. present cracks or seams or additional surfaces where the material being dispensed may become trapped. Contamination problems may become particularly serious where it is necessary to successively dispense different materials which must be of high purity from the same filling machine. Some filling machines may be steam cleaned after dispensing a first liquid material but if the first liquid material is trapped in cracks or seams about a valve the steam cleaning may not remove all of the first material. Thus a second material dispensed from the machine can become contaminated.

Pinch valves for controlling the flow of fluids are known. These valves generally include a flexible hose or sleeve through which a fluid is conveyed The flexible hose is pinched to reduce or stop the flow therethrough. Pinching of the hose may be accomplished by applying high pressure fluid about the outside of a portion of the hose, by mechanically compressing the hose, or by twisting the hose, etc. From the standpoint of reducing or eliminating contamination problems in liquid filling machines, pinch valves may be particularly advantageous in that the flexible hoses provide smooth and unobstructed passages for liquid flowing through the valve so as to avoid or minimize the additional surfaces, cracks or seams that could trap material. However, pinch valves can be problematical where fluids to be controlled are under high pressure. That is, the flexible hose of a pinch valve may be unduly distended or burst as a result of the high internal pressure. In order to avoid these problems it is known to provide a pressurized fluid about the outside of the flexible hose to minimize differential pressures on the hose or sleeve as in U.S. Pat. No. 4,108,418, for example. If the fluid pressure in the flow line varies significantly, it is necessary to adjust the pressure around the flexible hose to maintain a substantial balance of the internal and external pressures to prevent unwanted collapse or expansion of the sleeve In the case of manual control, this necessitates a time consuming monitoring of the pressure in the flow line and manual adjustment of the pressure supplied to the area about the flexible hose. However, the technique of visually monitoring the flow line pressure and manually adjusting the fluid pressure provided about the flexible hose is a time consuming process and may be unacceptable since a busy operator may forget to make the necessary adjustment or, where the pressure changes vary considerably in short periods of time, it is not possible for the operator to keep up with the necessary adjustments.

One prior art attempt to avoid these problems is suggested in U.S. Pat. No. 3,329,390 wherein a variable orifice valve is provided with a flexible hose or sleeve which is twisted for adjusting the flow of fluid therein. In this known valve, a pressure equalizing passageway is provided which communicates the fluid passage upstream of the flexible sleeve with a sealed annular space around the exterior of the sleeve so as to balance the pressure across the sleeve thereby preventing collapse of the sleeve due to pressure drops resulting from a restriction effected by the twisting of the hose. While this arrangement is suitable for controlling the flow of certain gases, if liquids are passing through the flow line it may be undesirable to allow the liquids to leave the flow line by way of the pressure equalizing passageway. Further, such a system may not function properly with high viscosity liquids. Moreover, this known valve is unacceptable where liquids of high purity are to be dispensed because of the contamination problems posed by the entrapment of liquid in the pressure equalizing passageway and the sealed annular space around the exterior of the sleeve. Steam cleaning would not effectively clean these areas without disassembly of the valve.

An object of the present invention is to provide a pinch valve which is suitable for controlling the flow of high pressure fluids, particularly liquids, which avoids the aforementioned disadvantages of the known valves. More particularly, an object of the invention is to provide a pinch valve which can be used for controlling the flow of fluids under pressure without requiring the constant attention of the operator and where the fluid pressures may vary significantly in short periods of time. A further object of the invention is to provide in a liquid filling machine for dispensing predetermined quantities of liquid which must be of high purity, a self-pressurizing pinch valve which avoids the contamination problems of the type referred to above.

These and other objects of the present invention are attained by providing a self-pressurizing pinch valve comprising flexible hose means for conveying a fluid, chamber means about at least a portion of the flexible hose means, the flexible hose means being adapted to be pinched in the chamber means for valving the flow of fluid therethrough, and means responsive to movement of the flexible hose means for controlling the pressure in the chamber means so that it substantially balances the internal pressure in the hose means.

According to a disclosed, preferred embodiment of the invention the means for controlling the pressure in the chamber means increases the pressure in the chamber means in response to radial expansion of the flexible hose means and decreases the pressure in the chamber means in response to radial contraction of the flexible hose means.

The means for controlling the pressure in the chamber means includes a valve means for controlling fluid communication between the chamber means and a source of pressurized fluid. The valve means is actuated in response to movement of the flexible hose means. In particular, a member drivingly associated with the valve means is positioned for movement adjacent an outer surface of the flexible hose means such that radial expansion of the hose means with increasing internal hose pressure causes the valve means to open and permit pressurized fluid from the source to enter the chamber means. The member drivingly associated with the valve means is a piston which is positioned adjacent the hose means in an additional chamber means in fluid communication with the chamber means.

According to a further feature of the invention, the means for controlling the pressure in the chamber means includes an outlet for releasing pressurized fluid from the chamber means. The outlet is closed by the flexible hose means when the pressure in the chamber means is less than or substantially equal to the internal pressure in the hose means and opened when the fluid pressure in the chamber means is substantially greater than the internal pressure in the hose means so as to radially compress the hose means.

The self-pressurizing pinch valve of the invention, when used with a solenoid actuated valve body, for example, for pinching the flexible hose means, results in a fast acting pinch valve suitable for use in liquid filling machines which does not pose unacceptable or undesirable contamination problems and which can be used to dispense fluids at low or high, variable pressures without necessitating the attention of the machine operator.

These and other objects, features and advantages of the present invention will become more apparent from the following description when taken in connection with the accompanying drawings, which show, for purposes of illustration only, one embodiment in accordance with the present invention.

DETAILED DESCRIPTION OF THE DISCLOSED EMBODIMENT

Figure 1:
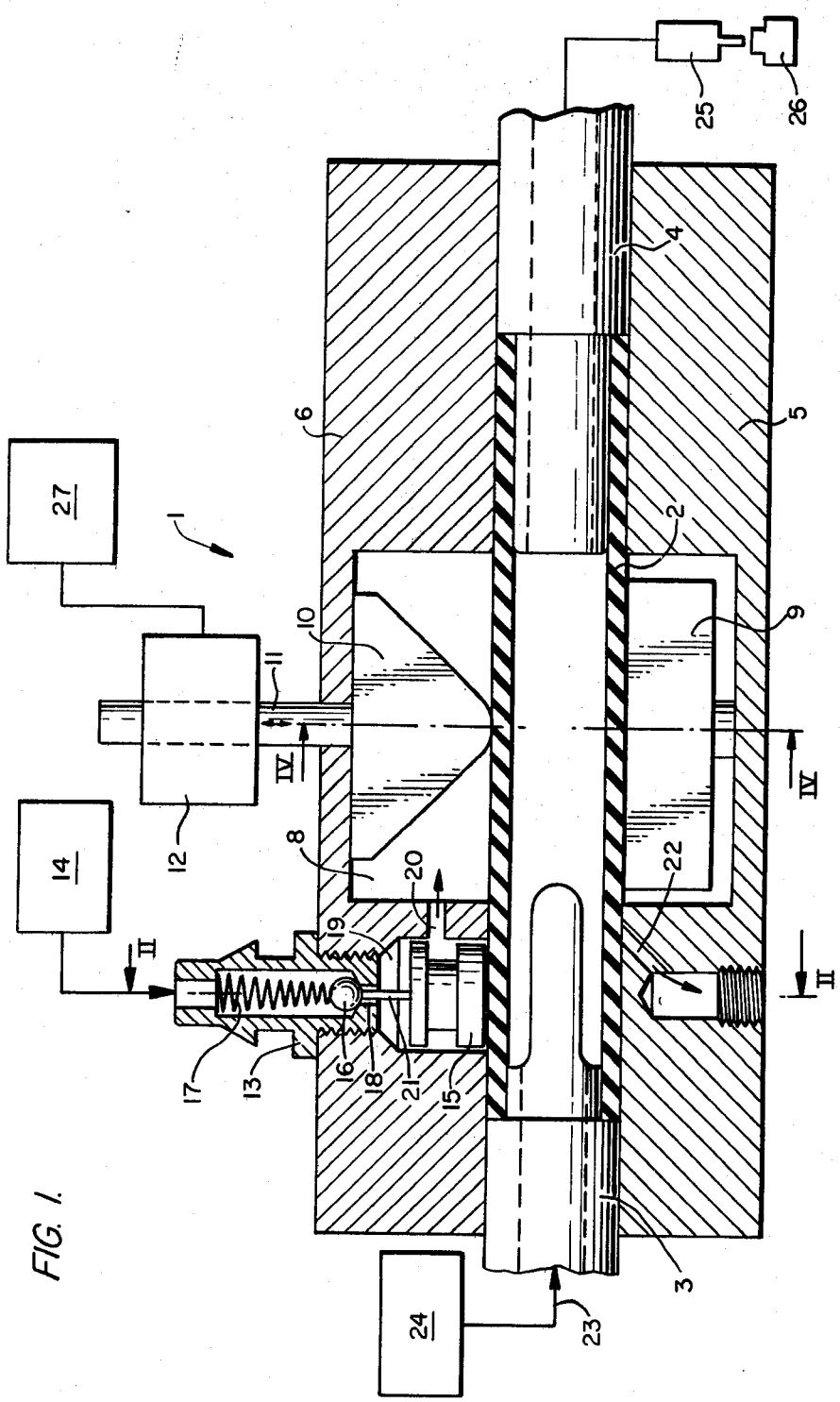
FIG. 1 is a longitudinal side view, partially in cross section, of a self-balancing pinch valve according to a preferred embodiment of the invention in a schematically illustrated liquid filling machine.

Referring now to the drawings, it is seen that the self-pressurizing pinch valve 1 according to the disclosed, preferred embodiment comprises a flexible elastomeric hose 2 for conveying a fluid. The ends of the flexible hose 2 are telescoped onto the reduced end portions of an inlet fitting 3 and an outlet fitting 4, respectively. The inlet and outlet fittings 3 and 4 and the ends of the flexible hose 2 thereon are clampingly engaged by valve body sections 5 and 6 of the pinch valve so as to maintain the ends of the hose in sealing engagement with the fittings and the surrounding valve body sections. The valve body sections are releasably connected to one another by suitable fasteners (not shown). The inlet and outlet fittings 3 and 4 are each formed with a central bore 7 therethrough for conveying a fluid.

Figure 4:
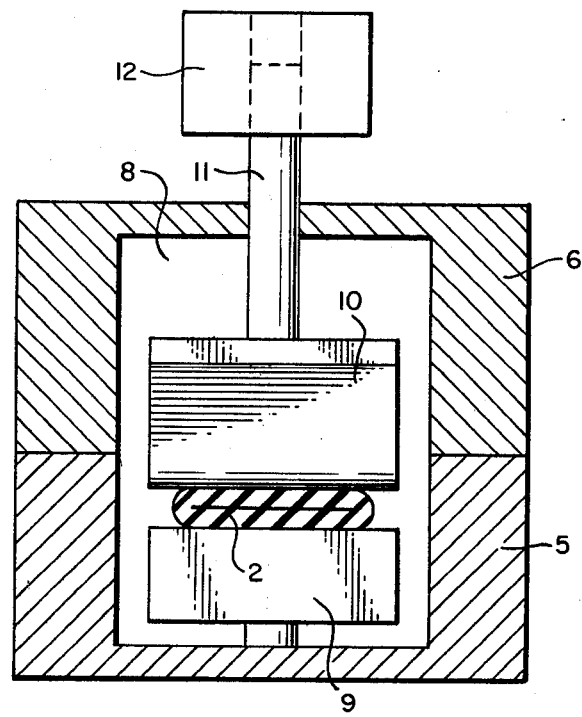
FIG. 4 is a partial cross sectional view of the pinch valve of FIG. 1 taken along the line IV—IV and showing the flexible hose in a pinched condition.

The valve body sections 5 and 6 of pinch valve 1 also define a chamber 8 about a portion of the hose 2. The hose 2 is adapted to be pinched in the chamber 8 between a stationary member 9 and a movable member 10 for stopping the flow of fluid through the hose. The hose 2 is shown in the pinched condition in FIG. 4. The movable member 10 is connected to a rod 11 which, in turn, extends through an actuating device 12 such as a solenoid.

The pinch valve 1 further includes means responsive to movement of the flexible hose 2 for controlling the pressure in the chamber 8 so that it substantially balances the internal pressure in the hose. This means for controlling the pressure in the chamber 8 includes check valve 13 for controlling fluid communication between the chamber 8 and a source of pressurized fluid such as air shown at 14 in FIG. 1. The check valve 13 includes a valve element 16 which is yieldably biased in a seated position by means of a spring 17 to close a passage 18 in the check valve.

Figure 2:
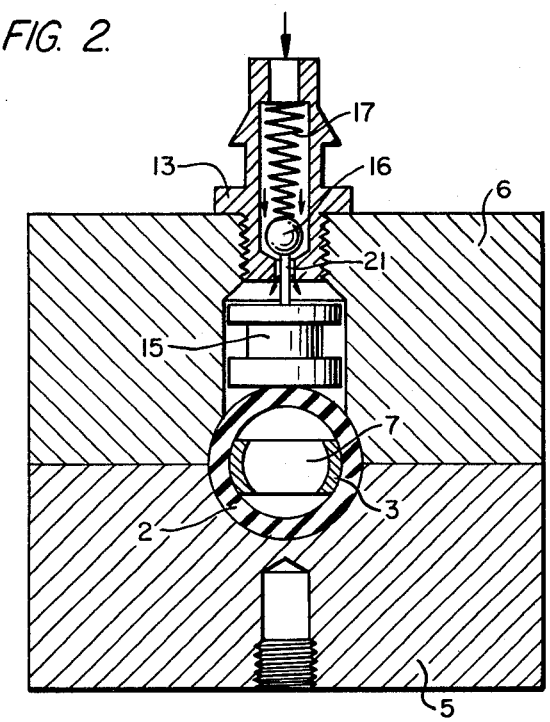
FIG. 2 is a partial cross sectional view of the pinch valve of FIG. 1 taken along the line II—II.

The valve element 16 is unseated in response to radial expansion of the flexible hose 2 to permit pressurized fluid from the source 14 to enter the chamber 8 by way of the passage 18, an additional chamber 19 and a passage 20 extending between the additional chamber 19 and chamber 8. More specifically, a member in the form of a piston 15 is drivingly associated with the valve element 16 by way of a rod 21. The piston 15 is positioned for movement adjacent an outer surface of the flexible hose 2 such that radial expansion of the hose with increasing internal hose pressure causes the valve element 16 to open the passage 18 and permit pressurized fluid from the source 14 to enter the chamber 8. This open position of the check valve 13 is illustrated in FIG. 2.

Figure 3:
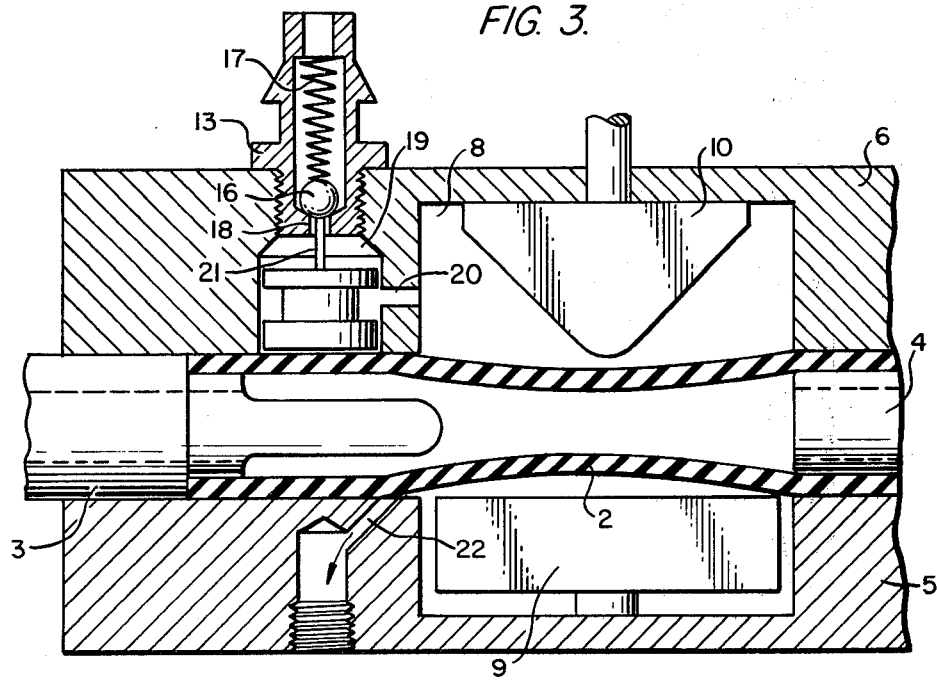
FIG. 3 is a view similar to FIG. 1 showing the flexible hose of the pinch valve partially collapsed as a result of a pressure differential on the hose created by a drop in the fluid pressure within the hose thereby opening an air outlet of the valve.

The means for controlling the pressure in the chamber 8 further includes an outlet 22 for releasing fluid from the chamber when the pressure therein substantially exceeds the pressure within the hose as in the case of a pressure drop within the hose, for example. The outlet 22 is closed by the flexible hose 2 when the pressure in the chamber 8 is less than or substantially equal to the internal pressure in the hose and is opened when the fluid pressure in the chamber 8 is substantially greater than the internal pressure in the hose so as to radially compress the hose in the manner shown in FIG. 3 thereby permitting the escape of the pressurized fluid in the chamber 8 and a reduction of the pressure therein. Thus, a substantial change in the fluid pressure within the flexible hose 2 of the pinch valve 1 will automatically result in a corresponding increase or decrease in the pressure in chamber 8 so as to maintain a substantial balance of the pressures on the hose.

As shown in FIG. 1, the pinch valve of the invention is provided in an otherwise conventional liquid filling machine for dispensing predetermined quantities of liquid. The filling machine comprises a flow line, shown schematically at 23, for conveying liquid under pressure from a supply 24 to a nozzle 25 for dispensing the liquid into containers such as that shown at 26 in FIG. 1. The pinch valve 1 is provided in the flow line 23 of the filling machine between the nozzle 25 and the liquid supply 24. The actuating device 12, such as a solenoid, is periodically actuated by a suitable control 27 to dispense predetermined quantities of liquid. The operation of the control 27 may be either manual or automatic. In such an arrangement, the self-pressurizing pinch valve 1 of the invention automatically regulates the pressure in the chamber 8 of the valve about the flexible hose 2 so that it substantially balances the internal pressure in the hose. That is, the pressure from the source 14 is greater than the maximum expected pressure of the fluid being conveyed within the hose 2 so that with any variations of the liquid pressure within the hose 2, the pressure within the chamber 8 can be automatically increased or decreased to substantially balance the internal pressure by means of the operation of the pinch valve of the invention as described above.

While I have shown and described only one embodiment in accordance with the present invention, it is understood that the same is not limited thereto but is susceptible of numerous changes and modifications as would be known to those skilled in the art, given the present disclosure. For example, the pinch valve of the invention could be used to control the flow of gases as well as liquids and its application is not limited to use in liquid filling machines. I therefore do not wish to be limited to the details shown and described therein but intend to cover all such changes and modifications as are encompassed by the scope of the appended claims.

I claim:

1. A self-pressurizing pinch valve comprising flexible hose means for conveying a fluid, chamber means about at least a portion of said flexible hose means, said flexible hose means being adapted to be pinched in said chamber means for valving the flow of fluid therethrough, and means responsive to movement of said flexible hose means for controlling the pressure in said chamber means so that it substantially balances the internal pressure in said hose means.

2. A self-pressurizing pinch valve according to claim 1, wherein said means for controlling the pressure in said chamber means increases the pressure in said chamber means in response to radial expansion of said flexible hose means.

3. A self-pressurizing pinch valve according to claim 1 or 2, wherein said means for controlling the pressure in said chamber means decreases the pressure in said chamber means in response to radial contraction of said flexible hose means.

4. A self-pressurizing pinch valve according to claim 1, wherein said means for controlling the pressure in said chamber means includes a valve means for controlling fluid communication between said chamber means and a source of pressurized fluid, said valve means being actuated in response to movement of said flexible hose means.

5. A self-pressurizing pinch valve according to claim 4, wherein a member drivingly associated with said valve means is positioned for movement adjacent an outer surface of said flexible hose means such that radial expansion of the hose means with increasing internal hose pressure causes said valve means to open and permit pressurized fluid from said source to enter said chamber means.

6. A self-pressurizing pinch valve to claim 5, wherein said member is a piston which is positioned adjacent the hose means in an additional chamber means.

7. A self-pressurizing pinch valve according to claim 6, wherein said chamber means and said additional chamber means are in fluid communication with one another.

8. A self-pressurizing pinch valve according to claim 1, 4, 5, 6 or 7, wherein said means for controlling the pressure in said chamber means includes an outlet for releasing pressurized fluid from said chamber means, said outlet being closed by said flexible hose means when the pressure in said chamber means is less than or substantially equal to the internal pressure in the hose means and said outlet being opened when the fluid pressure in said chamber means is substantially greater than the internal pressure in the hose means so as to radially compress said hose means.

9. In a liquid filling machine for dispensing predetermined quantities of liquid comprising a flow line for conveying liquid under pressure from a supply to nozzle means for dispensing said liquid, the improvement comprising a self-pressurizing pinch valve means provided in said flow line between said nozzle means and said supply for controlling the flow of liquid in said flow line, said pinch valve means including flexible hose means for conveying said liquid, chamber means about at least a portion of said flexible hose means, said flexible hose means being adapted to be pinched in said chamber means for valving the flow of liquid therethrough, and means responsive to movement of said flexible hose means for controlling the pressure in said chamber means so that it substantially balances the internal pressure in said hose means.

* * * * *